United States Patent [19]
Fujii et al.

[11] Patent Number: 5,937,959
[45] Date of Patent: Aug. 17, 1999

[54] CONVEYANCE APPARATUS

[76] Inventors: Naoto Fujii, 4-17-14, Numame, Isehara-Shi, Kanagawa-Ken; Masayoshi Ito, 1-13-47, Morinosato, Atsugi-Shi, Kanagawa-Ken; Tsutomu Hara, 4-33-21, Kugayama, Suginami-Ku, Tokyo; Kazuharu Seki, 2-14-2, Kamata, Setagaya-Ku, Tokyo, all of Japan

[21] Appl. No.: 08/714,944

[22] Filed: Sep. 17, 1996

[30] Foreign Application Priority Data

Sep. 25, 1995 [JP] Japan .................................. 7-270603

[51] Int. Cl.⁶ ...................................................... B60K 1/00
[52] U.S. Cl. ............................ 180/12; 180/253; 180/65.1
[58] Field of Search .................................. 180/65.1, 907, 180/65.6, 6.5, 22, 252, 253, 13, 12; 297/DIG. 4

[56] References Cited

U.S. PATENT DOCUMENTS

| | | | |
|---|---|---|---|
| 3,872,945 | 3/1975 | Hickman et al. | 180/65.1 |
| 4,513,832 | 4/1985 | Engman | 180/907 |
| 5,183,133 | 2/1993 | Roy et al. | 180/907 |
| 5,249,636 | 10/1993 | Kruse et al. | 180/907 |
| 5,445,233 | 8/1995 | Fernie et al. | 180/6.5 |

FOREIGN PATENT DOCUMENTS 5-85178  12/1993  Japan .

Primary Examiner—Richard M. Camby
Attorney, Agent, or Firm—Flynn, Thiel, Boutell & Tanis, P.C.

[57] ABSTRACT

A conveyance apparatus, and more particularly, an improvement of a transfer aid mechanism which allows a patient to be transferred from a bed to a wheelchair, for example, is disclosed. The transfer aid mechanism according to the invention includes casters disposed at four locations on a frame, and a drive mechanism which is elevatable with respect to the frame. When required, the drive mechanism is lowered to bring its drive wheel into contact with a floor, and when the drive wheel is driven for rotation under this condition, the transfer aid mechanism may be moved back and forth by utilizing the drive wheel alone. Accordingly, a travelling movement of the transfer aid mechanism is facilitated if there is a carpet laid over the floor or there is a step in the floor.

6 Claims, 10 Drawing Sheets

CONVEYANCE APPARATUS

FIELD OF THE INVENTION

The invention relates to an improvement of a conveyance apparatus, and more particularly, to an improvement of a transfer aid mechanism which is used for transferring a patient from a bed onto a wheelchair, for example.

DESCRIPTION OF THE PRIOR ART

A transfer aid mechanism which is used for transferring a patient from a bed onto a wheelchair is known in the art (see Japanese Patent Publication No. 85,178/93, for example). A conventional transfer aid mechanism of the kind described includes a body which defines a frame carrying four casters at its bottom. Initially, a patient is transferred from a bed onto the body, and an assistant or a supporter either pushes or pulls the mechanism occupied by the patient for travelling over a required distance. Subsequently, the patient is transferred from the mechanism onto a wheelchair. Because a conventional transfer aid mechanism is driven by being pushed or pulled by an adult assistance, and is not provided any special power unit, there occurs an increased physical load imposed upon the assistant who drives the mechanism where there is a step in a floor or where a carpet is laid over the floor, thus presenting a disadvantage.

A motorized wheelchair is known in the art in which the chair is provided with motor driven drive wheels which are maintained in contact with the floor, thus enabling a physical load imposed upon the assistance to be alleviated when travelling the mechanism. However, the provision of such motor driven drive wheels, which are maintained in contact with the floor, on the transfer aid mechanism results in an increased cost, an increased weight and an increased size of the transfer aid mechanism. In addition, since the drive wheels are always in contact with the floor, there results another disadvantage that the mechanism can not make a small turn.

SUMMARY OF THE INVENTION

In view of the foregoing, according to a first aspect of the invention, there is provided a conveyance apparatus which is adapted to run by a plurality of casters mounted on a frame, comprising an elevator mounted on the frame in a vertically elevatable manner, a drive mechanism mounted on the elevator and including drive wheels, a stop member for retaining the elevator at its elevated end, and a drive switch for driving the drive wheels of the drive mechanism for rotation when required, the arrangement being such that the drive wheels of the drive mechanism are removed from a floor whenever the elevator is maintained at its elevated end by the stop member while the drive wheels of the drive mechanism are lowered into contact with the floor upon terminating the retention of the elevator by the stop member.

According to a second aspect of the invention, the conveyance apparatus as mentioned above is provided with rollers at locations in the vicinity of a point disposed below the center of gravity of the apparatus when an article to be carried is placed thereon.

According to the arrangement of the first aspect of the invention, the drive wheels may be raised away from the floor through the elevator when there is no need to use the drive wheels, thus allowing the conveyance apparatus to be either pushed or pulled by an assistant for travelling in the same manner as in the prior art. On the other hand, when there is need to use the drive wheels, they may be returned into contact with a floor and driven for rotation, thus allowing the drive wheels to be power driven to facilitate a travelling of the conveyance apparatus without requiring a pushing of the apparatus by an assistant, if there is a step in the floor. In this manner, a physical load imposed upon an assistant can be alleviated through the provision of drive wheels while allowing the conveyance apparatus to be either pushed or pulled by an assistant for travelling in the same manner as in the prior art without using the drive wheels, thus allowing the apparatus to make a small turn. Since the provision of a single mechanism is sufficient, an increase in the cost and weight of the conveyance apparatus can be suppressed. In this manner, a conveyance apparatus which exhibits an excellent workability to be provided while minimizing an increase in the cost and weight.

According to the second aspect of the invention, the provision of rollers in the vicinity of a point disposed below the center of gravity of the apparatus allows the conveyance apparatus to be turned in a facilitated manner about the roller or rollers, which then serve as a fulcrum, whenever it is desired to divert the direction of the conveyance apparatus, thus improving the maneuverability thereof.

Above and other objects, features and advantages of the invention will become apparent from the following description of several embodiments thereof with reference to the drawings.

DETAILED DESCRIPTION OF THE EMBODIMENTS

Figure 1:
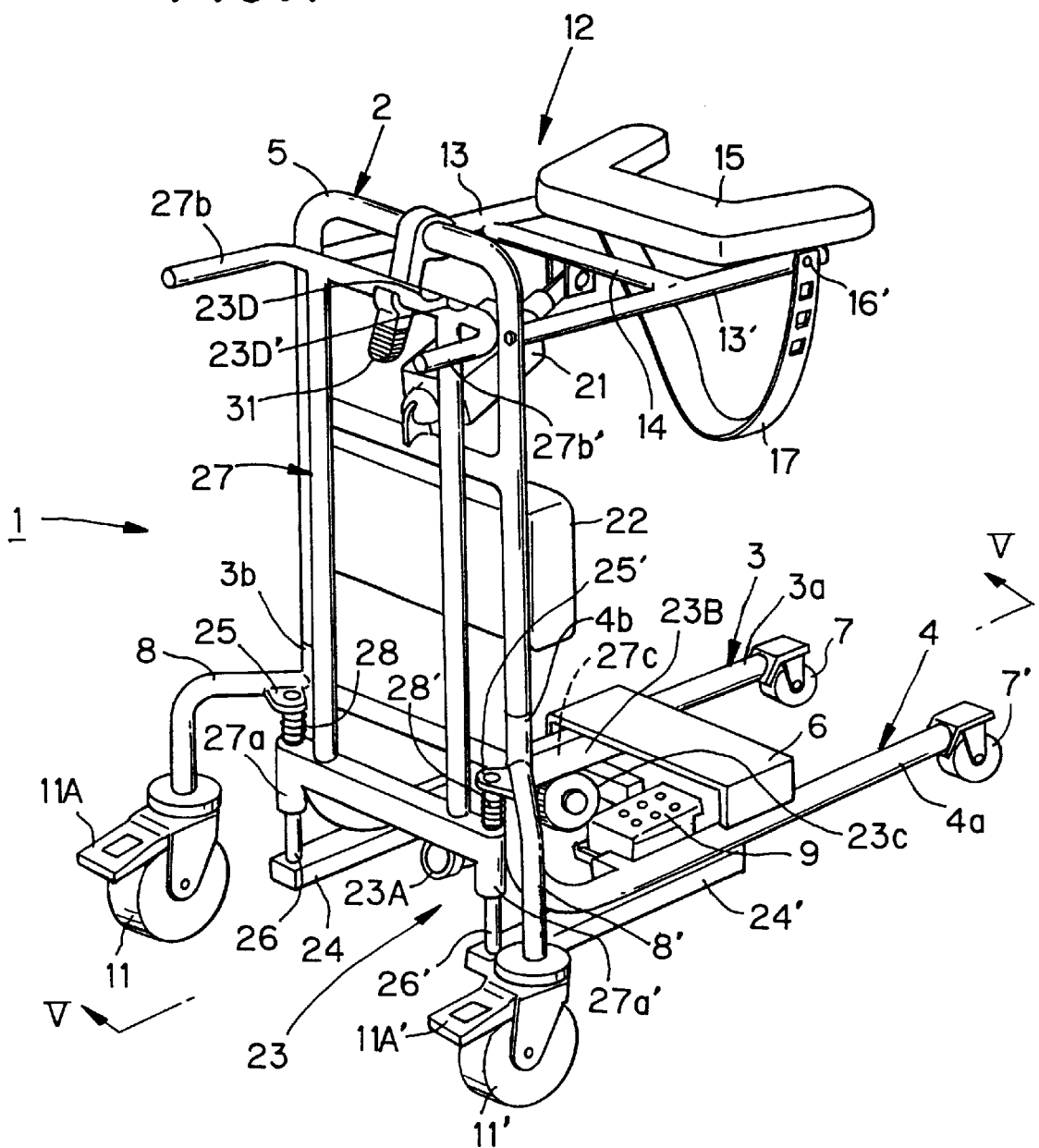
FIG. 1 is a perspective view of a first embodiment of the invention.
Figure 2:
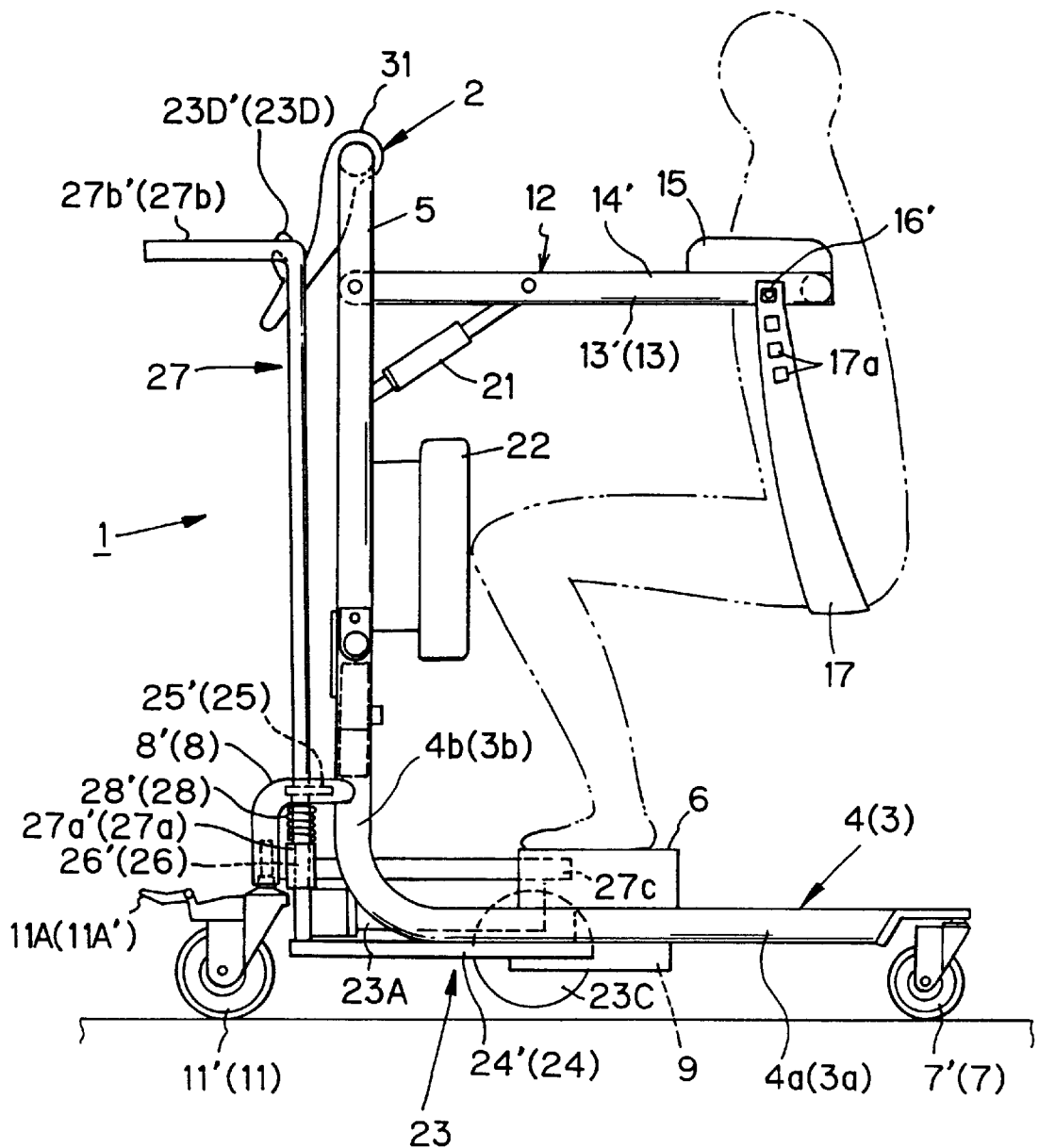
FIG. 2 is a front view of a transfer aid mechanism shown in FIG. 1.
Figure 3:
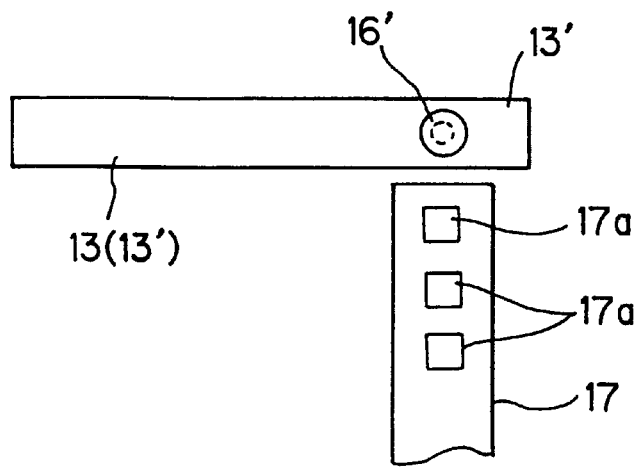
FIG. 3 is an enlarged view of an end of a suspension tool shown in FIG. 1.

Referring to the drawings, several embodiments of the invention will now be described. Initially referring to FIGS. 1 and 2, a transfer aid mechanism 1 includes a frame 2 which comprises a pair of left and right L-shaped pipes 3, 4, and a channel-shaped pipe 5 which is connected to the pipes 3, 4 at their upper ends.

The both pipes 3, 4 include horizontal sections 3a, 4a which extend horizontally, and vertical sections 3b, 4b which extend vertically. The both horizontal sections 3a, 4a are integrally connected together by a foot rest 6 so that they extend parallel to each other. Similarly, the vertical sections 3b, 4b are integrally connected together by the channel-shaped pipe 5, so that they extend parallel to each other. Front wheels 7, 7', comprising small casters, are mounted at the bottom of the free ends of the horizontal sections 3a, 4a. One end of each of L-shaped pipes 8, 8', is connected to respective one of the vertical sections 3b, 4b, and rear wheels 11, 11', comprising large casters, are attached to the bottom ends of the downwardly extending portions of the pipes 8, 8'. These rear wheels 11, 11' are provided with stops 11A, 11A', which allow the rear wheels 11, 11' to be locked to prevent the transfer aid mechanism 1 from travelling when necessary.

A suspension arm 12 which is used to suspend a patient is disposed in a rockable manner on the top portion of the vertical limbs of the vertical section of the pipe 5. The suspension arm 12 comprises a pair of left and right pipes 13, 13', a connecting member 14 which connects between the pipes 13, 13', and a breast abutting pad is which is disposed across the distal ends of the both pipes 13, 13'.

At a location which substantially defines the distal end of the suspension arm 12, the both pipes 13, 13' are provided with headed retention pins 16, 16' along their sides, which are detachably engaged by the opposite ends of a belt-like suspension tool 17. Specifically, the opposite ends of the suspension tool 17 is formed with a plurality of holes 17a of a given size, which are engageable with the heads of the retention pins 16, 16' or disengaged therefrom, thus allowing the suspension arm 12 to be detachably connected with the opposite ends of the suspension tool 17.

A motorized jack unit 21, which is known in itself, is disposed between the suspension arm 12 and the frame 2 to permit the suspension arm 12 to be fixed at any desired rocked position with respect to the frame 2. A battery 9 which serves as a power supply for the jack unit 21 is held by a support which is located below the foot rest 6. A knee abutting pad 22, which allows the knees of a patient who is suspended by the suspension arm 12 to abut against it, is mounted across the left and right vertical limbs on the frame 2 at a location below the suspension arm 12.

When it is desired to transfer a patient from a bed onto a wheelchair using the transfer aid mechanism 1, the both feet of the patient are placed on the foot rest 6 and his knees placed in abutment against pad 2 and his breast disposed in abutment against the pad 15 while suspending the buttocks of the patient by means of the suspension tool 17.

The described arrangement and operation remain substantially unchanged from the transfer aid mechanism disclosed in Japanese Patent Publication No. 85,178/93 except for a rocking mechanism which causes a rocking motion of the knee pad 22.

In the present embodiment, based on the arrangement of the transfer aid mechanism 1 mentioned above, the mechanism 1 is provided with an elevatable drive mechanism 23 so as to permit the transfer aid mechanism 1 to move back and forth by the drive mechanism 23 as required.

Specifically, in the present embodiment, a pair of rod-shaped brackets 24, 24' are connected to extend along the left and right horizontal sections 3a, 4a of the frame 2 toward the rear portion thereof, and a pair of brackets 25, 25' are also connected to the pipes 8, 8' which are located above the brackets 24, 24'. A pair of guide shafts 26, 26' are fixedly connected across vertically aligned brackets. An elevator frame 27 includes at its bottom a pair of sleeve portions 27a, 27a', which are slidably fitted over the both guide shafts 26, 26'. In this manner, the elevator frame 27 can be elevated relative to the frame 2 as guided by the guide shafts 26, 26'. At its top end, the elevator frame 27 is provided with a pair of handles 27b, 27b', which can be gripped by an assistant in order to push or pull the conveyance apparatus for causing a travelling of the apparatus in the similar manner as in the prior art whenever the drive mechanism 23 is not used. Also at its bottom, the elevator frame 27 is formed with a rod-shaped support 27c which extends horizontally in the forward direction, and a drive mechanism 23 is fixedly mounted on the support 27c.

Figure 4:
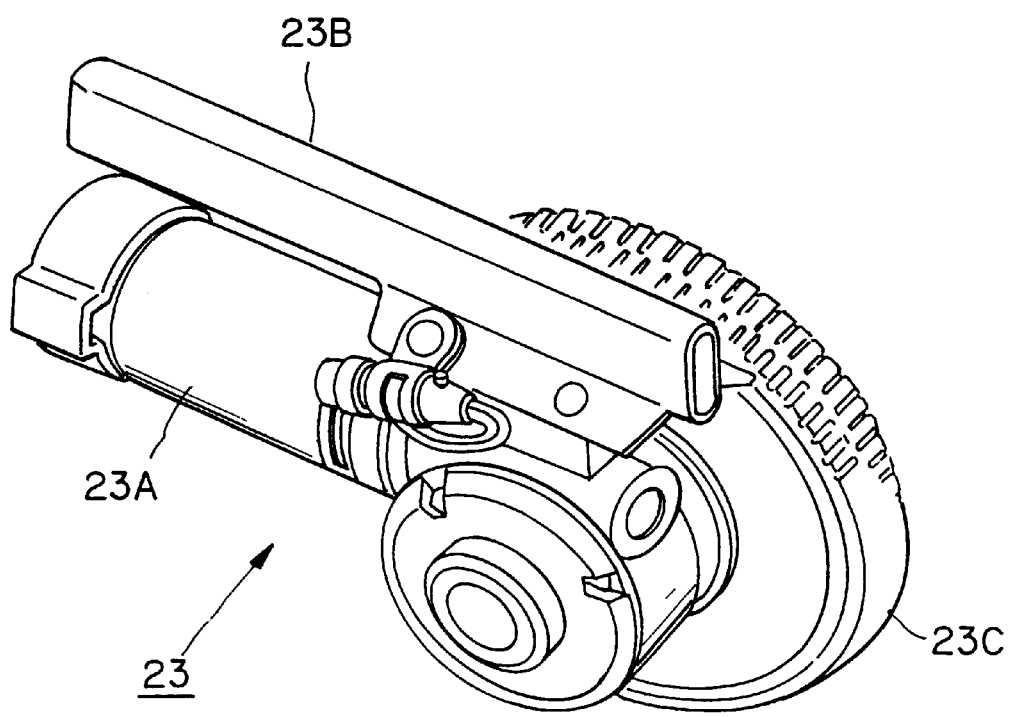
FIG. 4 is a perspective view of a drive mechanism shown in FIG. 1.
Figure 5:
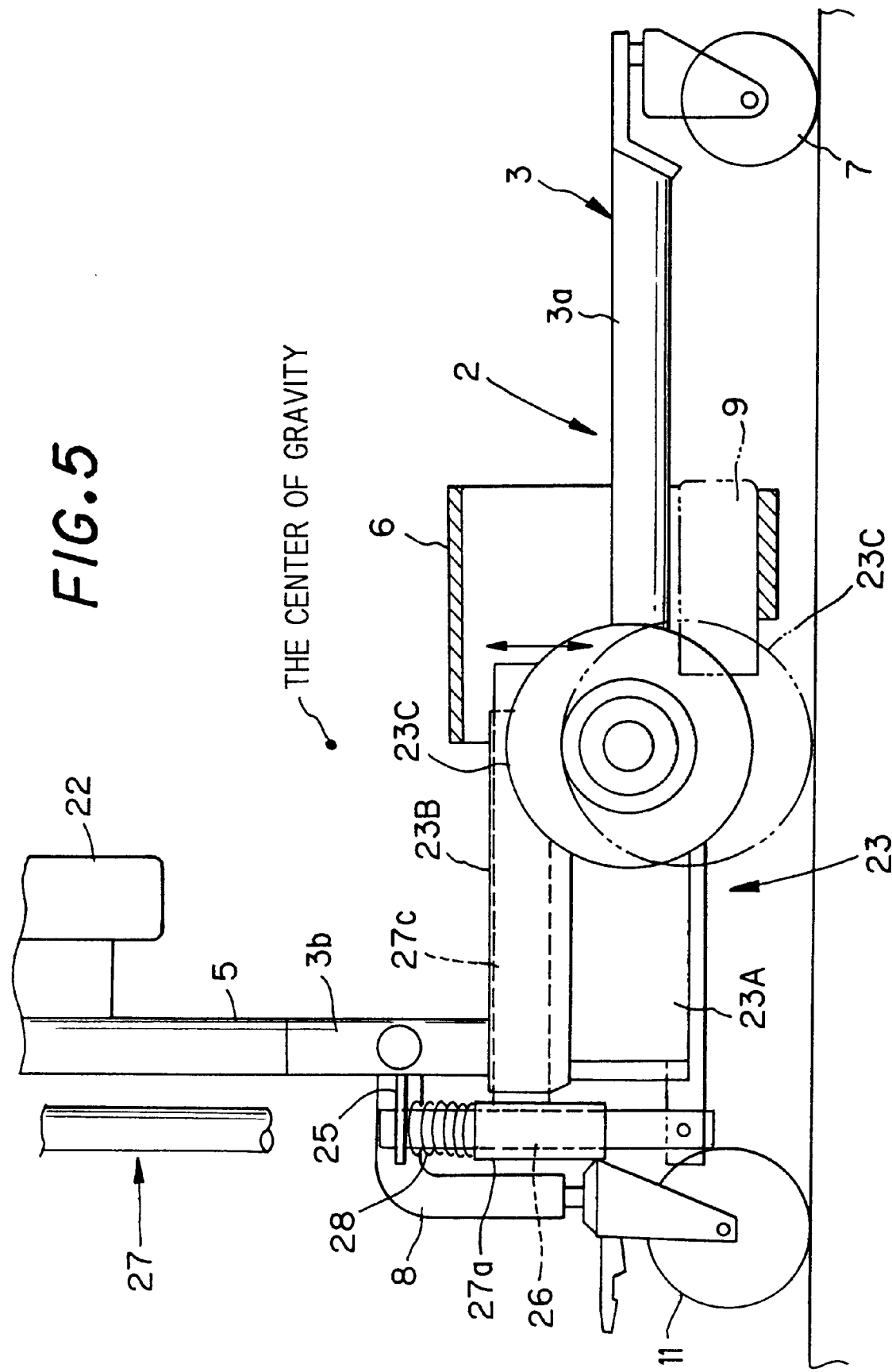
FIG. 5 is a cross section of part taken along the plane indicated by line V—V shown in FIG. 1.

The drive mechanism 23 may be any one of commercially available units. As shown in FIG. 4, it comprises a body unit 23A internally housing a motor connected to a drive unit and a reduction gearing, not shown, a tubular connector 23B carrying the body unit and which is fitted over the support 27c of the elevator frame 27, and a drive wheel 23C which is associated with the body 23A to be driven for rotation in either forward or reverse direction at a given number of revolutions.

It will be seen that when the connector 23B of the drive mechanism 23 is fitted over the support 27c of the elevator frame 27, the drive mechanism 23 is mounted in a horizontal position on the elevator frame 27 and hence the drive wheel 23C is supported in a vertical plane. In the present embodiment, the drive wheel 23C is mounted at a location which is disposed below the center of gravity of the transfer aid mechanism 1 having a patient suspended by means of the suspension arm 12. The drive mechanism 23 uses the battery 9 as a power supply, and includes a pair of drive switches 23D, 23D', which are disposed at the top end of the elevator frame 27. When the switch 23D is depressed, the drive wheel 23C is driven for rotation in a forward direction while when the drive switch 23D' is depressed, the drive wheel 23C is driven for rotation in a reverse direction.

A pair of coiled springs 28, 28' are disposed between the sleeve portions 27a, 27a' of the elevator frame 27 and brackets 25, 25', and accordingly, the elevator frame 27 is urged downward by the resilience of the coiled springs 28, 28' and the gravity of the elevator frame 27 itself.

A stop member 31 is mounted in a rockable manner on the top end of the frame 2 at its center, and the elevator frame 27 and the drive mechanism 23 can be retained at their elevated position by raising the elevator frame 27 (and the drive mechanism 23) against the resilience of the coiled springs 28, 28' to cause the stop member 31 to be engaged with the top end of the elevator frame 27 at its center. Under this condition, the drive wheel 23C of the drive mechanism 23 is removed from the floor. By contrast, when the stop member 31 is depressed to release the elevator frame 27 from its engagement with the stop member 31, the resilience of the coiled springs 28, 28' and the gravity of the elevator frame 27 cause it (and its associated drive mechanism 23) to be lowered, whereupon the drive wheel 23C is placed in contact with the floor and is then strongly pressed against the latter.

If the switch 23D is pushed under the condition that the drive wheel 23C is placed on the floor, the wheel 23C is driven for rotation in the forward direction, and accordingly, the transfer aid mechanism 1 can be driven forward under the influence of the power from the drive wheel 23C alone, without an intervention of an assistant to push the mechanism 1. On the other hand, when the switch 23D' is pushed, the drive wheel 23C is driven for rotation in the reverse direction, whereby the transfer aid mechanism 1 retracts.

When there is no need to drive the drive mechanism 23, the elevator frame 27 (and the drive mechanism 23) may be raised upward and the elevator frame 27 retained at its elevated end by means of the stop member 31, thus maintaining the drive wheel 23C removed from the floor. Under this condition, an assistant is free to push or pull the mechanism 1 for travelling it in the same manner as in the prior art.

As described, the present embodiment is based on the construction of a conventional transfer aid mechanism 1, on which an elevatable drive mechanism 23 is provided. Accordingly, whenever there is no need for the drive mechanism 23, an assistant can freely push or pull the mechanism in the same manner as before. Where there is a step in the floor or where a carpet and the like which is laid over the floor presents an increased resistance to the travelling motion of the mechanism, the drive wheel 23C may be lowered into contact with the floor and then driven for rotation, thereby allowing the power from the drive mechanism 23 to move the transfer aid mechanism 1 back and forth. In this manner, a travelling motion of the mechanism 1 which is occupied by a patient is facilitated. Where the mechanism is only provided with the front wheels 7, 7' which comprise casters and rear wheels 11, 11' as in the prior art, these wheels can rotate through 360° with respect to the frame 2, and this caused a degradation in the capability of the mechanism to advance in a beeline. However, it will be noted that when the drive wheel 23C is placed on the floor when advancing the transfer aid mechanism, the capability of the transfer aid mechanism to move in a beeline will be improved. In addition, when descending a sloped floor, the contact of the drive wheel 23C which is driven for rotation with the floor enables a proper braking action to be applied when travelling the mechanism 1. Also, when traversing across a sloped floor, a cross running of the transfer aid mechanism 1 can be favorably prevented by the presence of the drive wheel 23C which is maintained in contact with the floor when it is driven for rotation.

As mentioned above, the drive wheel 23C is located at a position below the center of gravity of the transfer aid mechanism 1 which is occupied by a patient. Accordingly, when diverting the direction of the transfer aid mechanism 1, the drive wheel 23C which is maintained in contact with the floor can act as a fulcrum when turning the drive wheel 23C. In this manner, the diversion of direction is facilitated, and a maneuverability of the transfer aid mechanism 1 is improved.

It will thus be seen that the provision of the elevatable drive mechanism 23 on the transfer aid mechanism 1 of the present embodiment permits a physical load imposed upon an assistant to be alleviated, and also permits the transfer aid mechanism to make a small turn in the similar manner as before by maintaining the drive mechanism 23 at its upper position when unnecessary. Since only one drive mechanism 23 is provided, a substantially increase in the cost and weight of the transfer aid mechanism 1 is avoided.

In the described embodiment, a torque sensor may be disposed at the location of the handles 27b, 27b', and a controller may be provided in association with the drive mechanism 23 in order to allow the controller to control the direction in which the drive wheel is rotated, depending on the direction in which the torque acts as detected by the torque sensor. Specifically, when an assistant pushes the handles 27b, 27b', this fact is detected by the torque sensor to cause the controller to enable the drive wheel to be driven for rotation in a forward direction to thereby cause an advancing movement of the aid mechanism while when an assistant pulls the handles 27b, 27b', the controller causes the drive wheel to be driven for rotation in a reverse direction to thereby cause the aid mechanism to retract. When an assistant frees the handles 27b, 27b', the controller may cease the rotation of the drive wheel.

Second Embodiment

Figure 6:
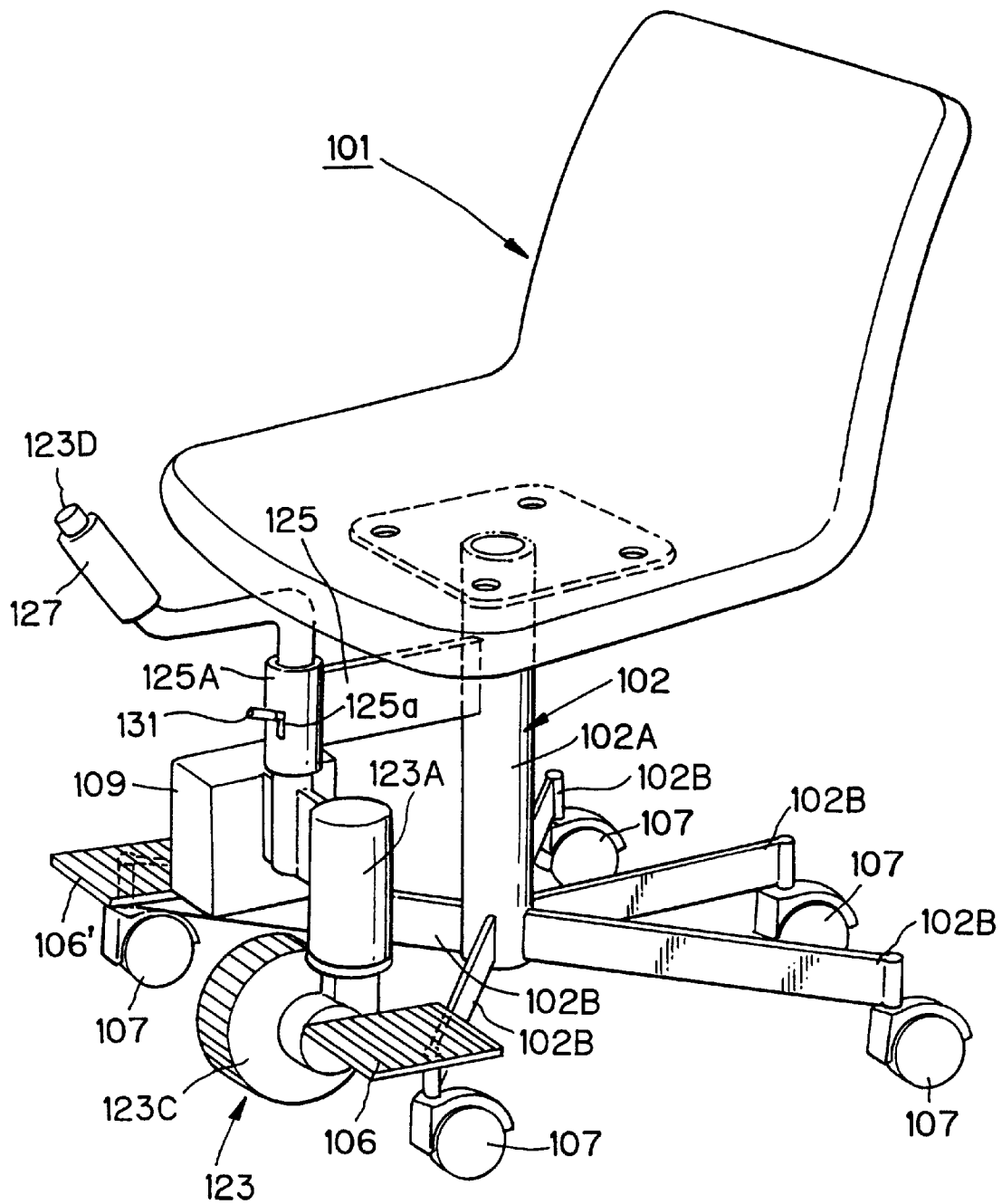
FIG. 6 is a perspective view of another embodiment of the invention.

FIG. 6 shows a second embodiment of the invention. This embodiment is based on a conventional chair 101 with casters, and an elevatable drive mechanism 123 which is similar to the elevatable drive mechanism of the first embodiment is mounted on the chair 101. Specifically, a frame 102 comprises a vertical pipe 102A, the bottom end of which is attached with five legs 102B, with each leg 102B carrying a caster 107. A bracket 127 is secured to the top end of the vertical pipe 102A to extend horizontally, with a sleeve 125A formed at the distal end of the bracket 125 through which a rod-shaped handle 127 extends in a rotatable and elevatable manner. The lower end of the handle 127 is connected with a drive mechanism 123, constructed in the similar manner as in the first embodiment, and a battery 109. The sleeve 125A is formed with a hook-shaped slit 125a, through which a stop pin 131 secured to the handle 127 projects outwardly.

When the handle 127 is turned in a right-hand direction after raising the handle 127 to its elevated end, the stop pin 131 becomes engaged with a horizontal portion formed at the top end of the slit 125a, whereby the drive mechanism 123 is also supported at its elevated end. Under this condition, a drive wheel 123C is removed from the floor. Hence, under this condition, it functions in the same manner as a conventional chair 101.

By contrast, when the handle 127 is gripped and turned in a left-hand direction, the stop pin 131 is disengaged from the horizontal portion of the slit 125a, whereupon the handle 127 and the drive mechanism 123 fall down by their own gravity, thus placing the drive wheel 123C on the floor. When a switch 123D mounted on a handle 127 is pushed forwardly under this condition, the drive wheel 123C is driven for rotation in the forward direction to advance the chair 101. On the other hand, when the switch 123D is pushed rearward, the drive wheel 123C is driven for rotation in the reverse direction, whereby the chair 101 retracts.

It will be noted that a pair of plate-shaped foot rests 106, 106' are mounted in a horizontal position on forward two of the legs 107 which are located adjacent to the drive mechanism 123, and when travelling the chair 101 by means of the drive wheel 123C, the both feet may be placed on these foot rests 106, 106'.

The chair 101 of the present embodiment thus constructed facilitates a travelling motion of the chair 101 by the presence of the drive mechanism 123 if there is a step in a floor, and thus is preferred for indoor use by a physically handicapped person.

Again, the provision of a single elevatable drive mechanism 123 on a conventional chair is sufficient, whereby an increase in the cost and weight is suppressed while providing a chair 101 which affords an excellent workability.

While the stop pin 131 engages a horizontal portion of the slit 125a formed in the sleeve 125A to maintain the drive mechanism 123 at its elevated end, an alternative arrangement may be used as described below. Specifically, a coiled spring having an increased resilience is disposed between the inner peripheral surface of the sleeve 125A and the outer periphery of the handle 127 which is located within the sleeve 125A to maintain the handle 127, the drive mechanism 123 and the battery 109 carried thereby at their raised end. In this instance, the handle 127 may be gripped by hand to bring the drive wheel 123C into contact with the floor against the resilience of the coiled spring which is disposed within the sleeve 125A before the drive wheel 123C is driven to advance the chair 101. By suitably rotating the handle 127, the direction in which the chair 101 travels may be diverted by means of the drive wheel 123C.

Third Embodiment

Figure 7:
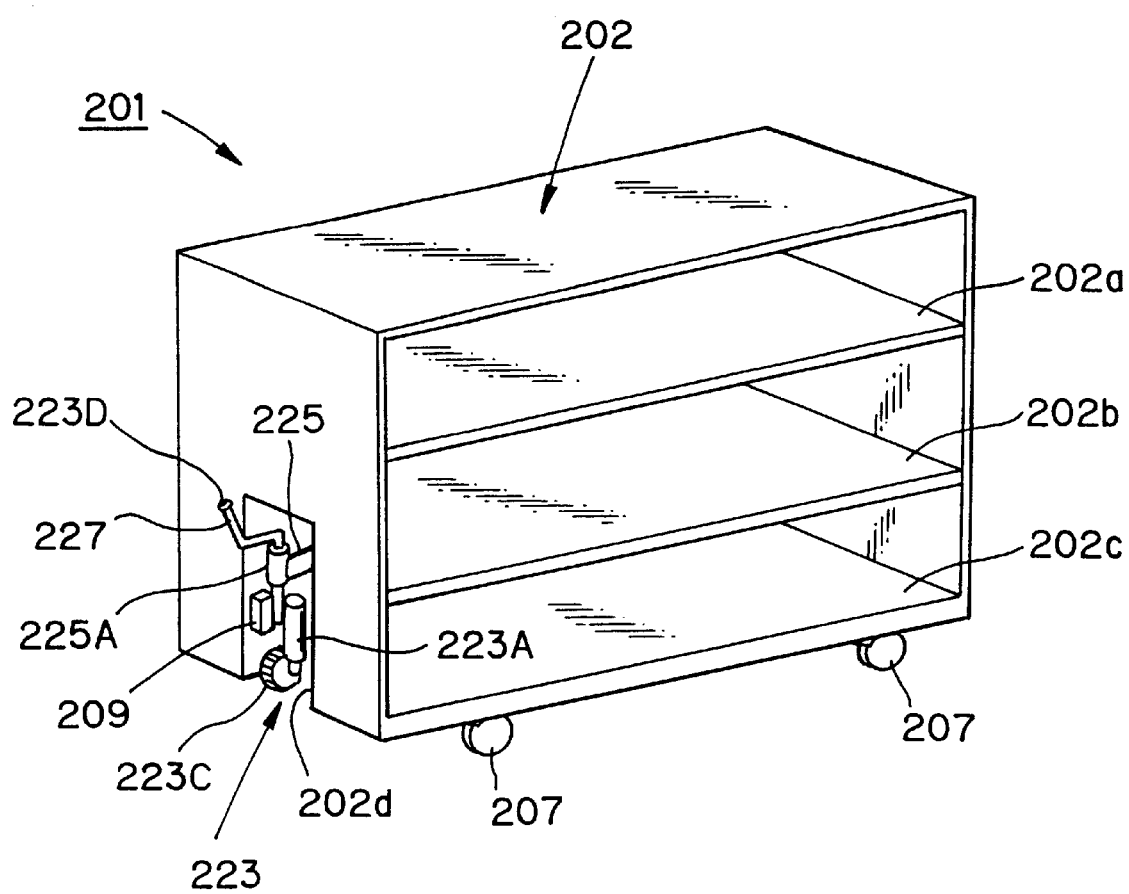
FIG. 7 is a perspective view of a further embodiment of the invention.

FIG. 7 shows a third embodiment of the invention in which the invention is applied to a wagon 201 which is used to convey a feeding in a hospital or a school.

Specifically, a conveying wagon 201 includes a frame 202 which is provided with a plurality of horizontal shelves 202a, 202b, 202c, each of which is open at the side to permit a plurality of trays used for a feeding to be accessed into these shelves. Casters 207 are attached to the bottom of the frame 202 at four corners.

A recess 202d is formed in the side of the conveying wagon 201, which is located on the left-hand side, as viewed in FIG. 7, the recess 202d extending from the bottom to a given elevation. A drive mechanism 223 constructed in the same manner as in the second embodiment is mounted within the recess 202d in an elevatable manner. A plate-shaped bracket 225 and a sleeve 225A, similar to those provided in the second embodiment, are disposed within the recess 202d, and a handle 227 similar to that shown in the second embodiment is mounted in the sleeve 225A, with a drive mechanism 223 and a battery 209 similar to those shown in the second embodiment being attached to the lower portion of the handle 227. While not shown, the sleeve 225A in which the handle 227 is mounted is formed with a hook-shaped slit similar to that shown in the second embodiment, and a stop pin which engages the slit is secured to the handle 227.

When the wagon 201 is to be travelled over an increased distance, the drive mechanism 223 may be lowered and the drive wheel 223C may be driven for rotation, thus facilitating a travelling motion of the wagon 201.

If there is a step in the floor, the use of the drive mechanism 223 facilitates a travelling movement of the wagon 201. In this manner, a conveying wagon 201 with an excellent workability can be provided while suppressing an increase in the cost and weight.

While the third embodiment illustrates the application of the invention to the wagon 201 which conveys a feeding, the invention is equally applicable to other wagons which carry and convey an increased number of clothes or wares.

In the second and third embodiments, the drive mechanism 123 (or 223) is adapted to place the drive wheel 123C (or 223C) on the floor by its own gravity, but the entire drive mechanism 123 (or 223) may be normally urged downward by means of a spring so that when the drive wheel 123C (or 223C) is placed on the floor, it may be strongly urged against the floor.

Fourth Embodiment

Figure 8:
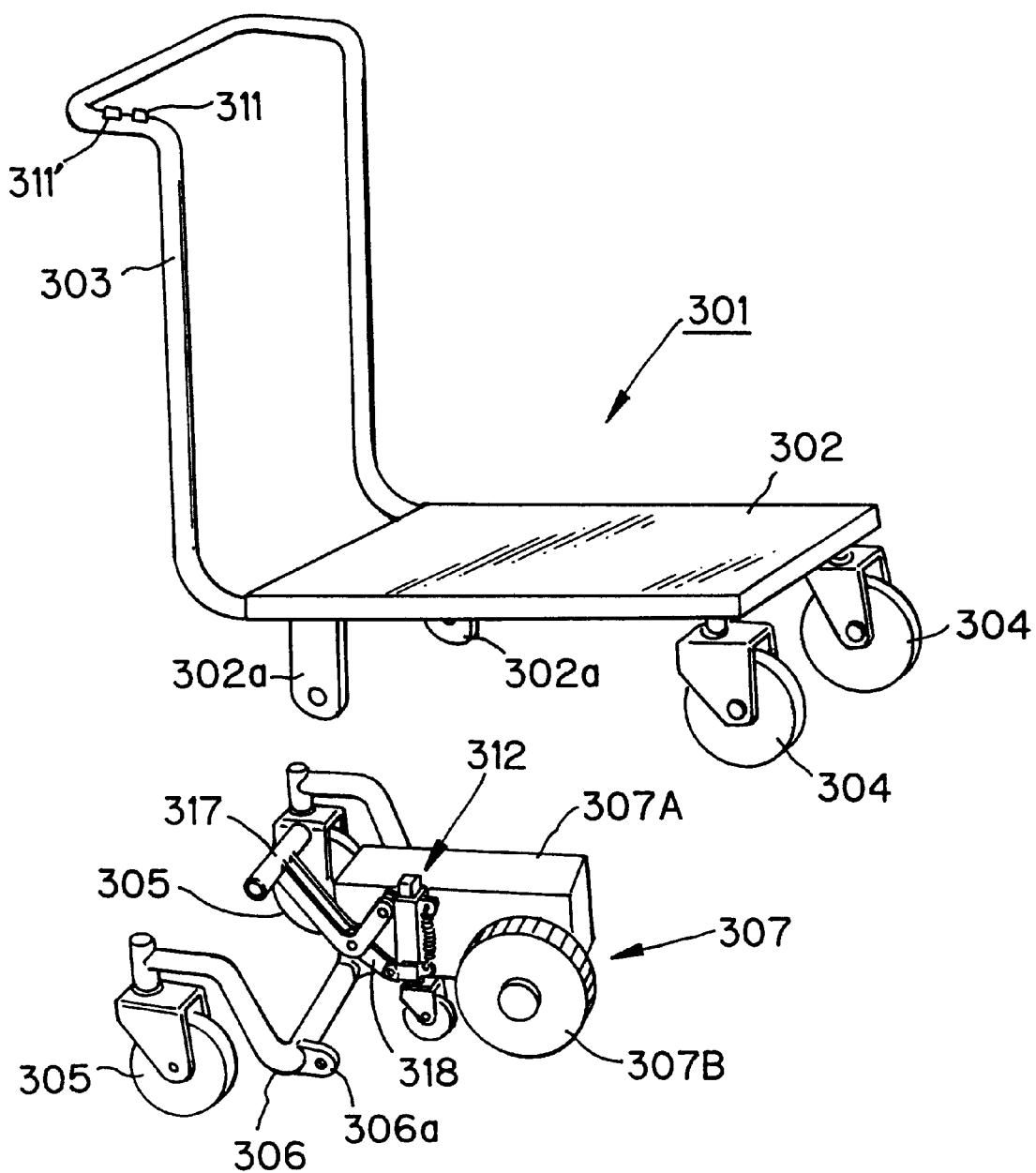
FIG. 8 is an exploded perspective view of an additional embodiment of the invention.
Figure 9:
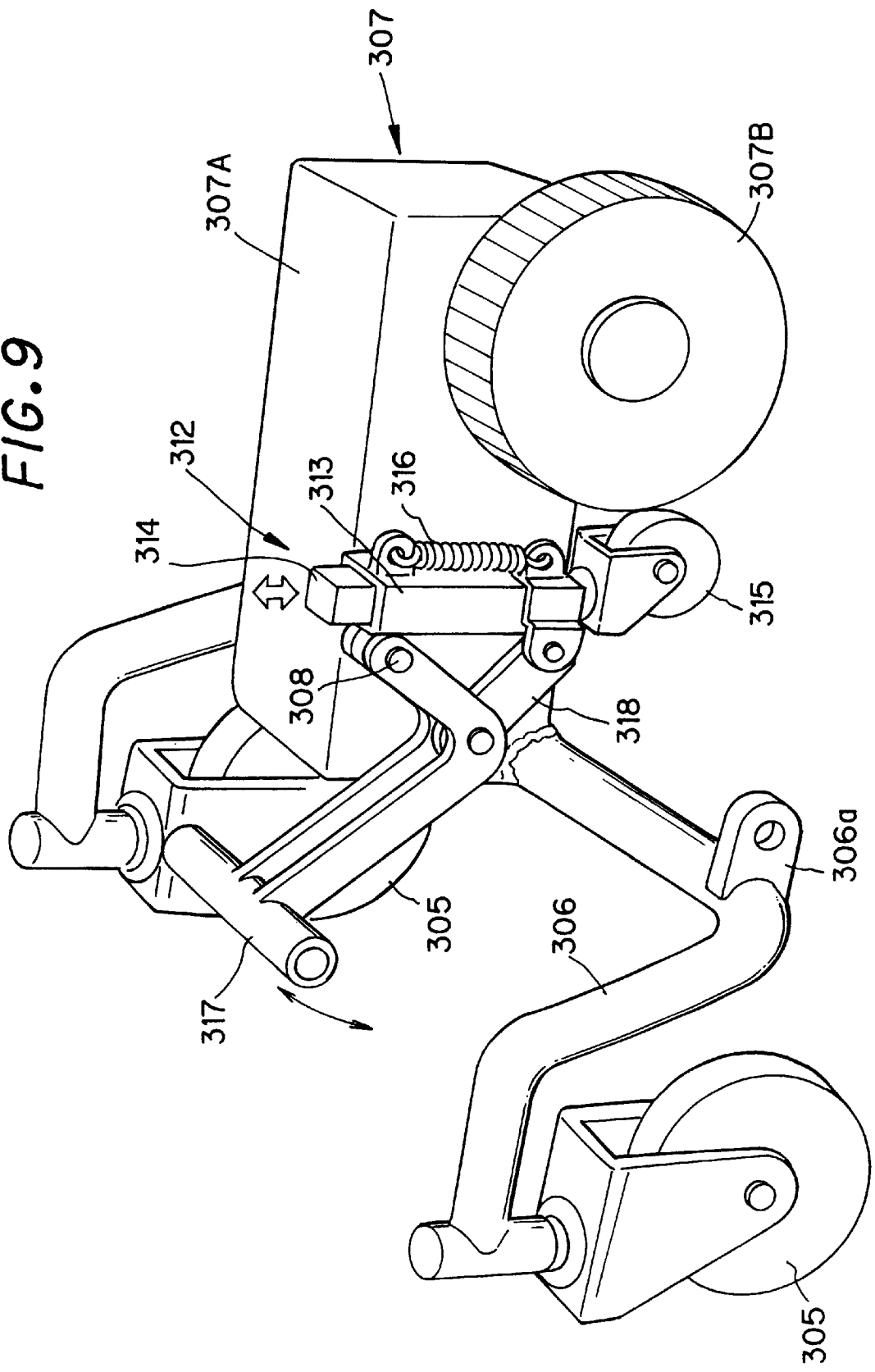
FIG. 9 is an enlarged view of part shown in FIG. 8.

FIG. 8 and 9 illustrate a fourth embodiment of the invention, which illustrates the application of the invention to a cart.

Specifically, the cart 301 includes a plate-shaped frame 302 on which an article or articles to be conveyed are placed, and the rear side of the frame 302 is integrally connected with a handle 303 which comprises a substantially channel-shaped pipe. A pair of large casters 304, which are similar to those used in the prior art, are mounted at the bottom of the front end of the frame 302 along the both lateral sides.

By contrast, a pair of casters 305 which are disposed toward the rear side of the frame 302 are attached to the opposite sides of a connecting member 306 which is connected to the frame 302 in a rockable manner. A drive mechanism 307 is connected to the connecting member 306 to permit a travelling of the cart 301.

The connecting member 306 comprises a substantially U-shaped pipe and includes a rectilinear portion extending crosswise of the connecting member 306 and having its opposite ends connected with brackets 306a which are provided with a through-opening. On the other hand, along the opposite sides, the bottom of the frame 302 at its rear side is connected with brackets 302a, each having a through-opening. By disposing the left and right brackets 306a of the connecting member 306 so as to be aligned with the left and right brackets 302a on the frame 302 from the outside, connecting pins, not shown, may be passed through the through-openings formed in the respective brackets 302a, 306a which are thus maintained in alignment, and then their ends may be caulked. In this manner, the connecting member 306 is mounted so as to be vertically rockable with respect to the frame 302.

A drive mechanism 307 of the fourth embodiment is constructed in the similar manner as in the first embodiment except that the connector 23B of the first embodiment is omitted, and includes a body 307A which is secured to the rectilinear portion of the connecting member 306 at its central location. In this manner, a drive wheel 307B carried by the drive mechanism 307 is located below the center of gravity of the frame 302 when an article or articles to be conveyed are placed thereon. It is to be noted that the center of rotation of the drive wheel 307B is directed perpendicular to the lengthwise direction of the frame 302. A horizontal section of the handle 303, which represents the top end thereof, is provided with a pair of operating switches 311, 311'. When a forwardly located switch 311 is depressed, the drive wheel 307B is driven for rotation in the forward direction while when a rearwardly located switch 311' is depressed, the wheel 307B is driven for rotation in the reverse direction.

In the present embodiment, a switching mechanism 312 is disposed adjacent to the drive mechanism 307 to allow the drive wheel 307B to be switched between a lower position (FIG. 10) where it is disposed in contact with a floor and an upper position (FIG. 11) where it is removed from the floor.

Specifically, connected to the lateral side of the body 307A of the drive mechanism 307 is a vertically oriented guide pipe 313 which has a square cross section, through which a prism-shaped elevating member 314 extends in a slidable manner. A small caster 315 is attached to the lower end of the elevating member 314 which projects below the guide pipe 213. A tension spring 316 is connected across the elevating member 314 and the guide pipe 313, whereby the elevating member 314 and caster 315 are normally urged upward with respect to the body 307A of the drive mechanism 307.

An L-shaped lever 317 is pivotally mounted at a support pin 308 on the lateral side of the body 307A at a location proximate to the guide pipe 313 so as to be rockable in a vertical plane. The projection at the lower end of the elevating member 314 and the central portion of the lever 317 are connected together by a link 318.

Figure 10:
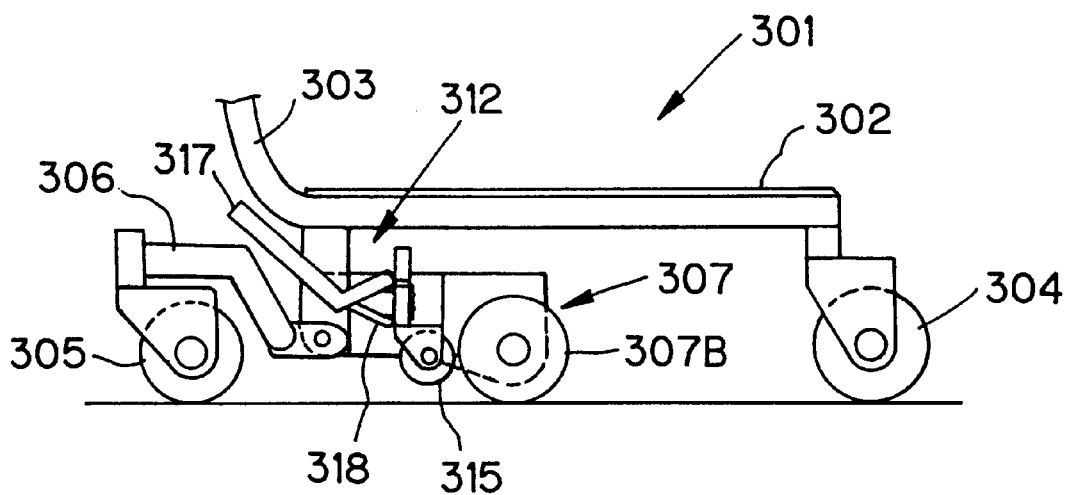
FIG. 10 is a front view of an essential part of a carriage subsequent to the assembly of components shown in FIG. 8.

When the lever 317 is positioned at its first position shown in FIG. 8 or 9, the link 318 assumes an inclined position, and the caster 315 assumes its raised position shown where it comes to rest under the influence of the tension spring 316. At this time, the drive wheel 307B is at its lower position which is located lower than the caster 315, as shown in FIG. 10, and accordingly the drive wheel 307B is also disposed in contact with the floor, in addition to the four casters 304, 305 which are disposed at the four corners of the frame 302. Accordingly, when the drive wheel 307B is rotated under this condition, the cart 301 can be driven for movement back and forth by the drive mechanism 307.

Figure 11:
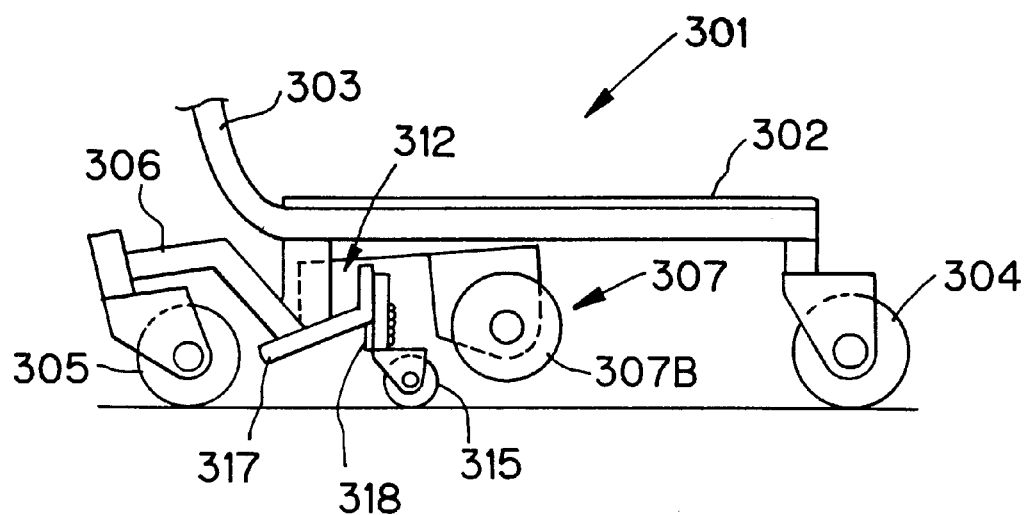
FIG. 11 is a front view illustrating a different condition from FIG. 10.

By contrast, when the lever 317 is depressed to its second position as shown in FIG. 11, the link 318, which assumed an inclined position before, is erected in a direction toward the vertical direction and slightly past forward beyond the vertical position, and then the top end of the link 318 abuts against the guide pipe 313. As a consequence, the elevating member 314 and the caster 315 are lowered through a given amount relative to the body 307A of the drive mechanism 307 against the resilience of the tension spring 316. This brings the caster 315 which has been located upward of the drive wheel 307B to the same elevation as the drive wheel 307B so as to be disposed in contact with the floor, and as the lever 317 is further depressed, the connecting member 306 connected to the body 307A of the drive mechanism 307 is rocked to raise the drive mechanism 307, whereby the drive wheel 307B assumes its upper position where it is removed from the floor. At the time the top end of the link 318 abuts against the guide pipe 313 in the manner mentioned above, the lever 317 is locked by the link 318, and accordingly the lever 317 is maintained in its second position while the drive wheel 307B is maintained in its upper position.

Under this condition, the four casters 304, 305 disposed at the four corners of the frame 302 as well as the caster 315 mounted on the lower end of the elevating member 314 are disposed in contact with the floor.

When the lever 317 is pulled toward an assistant under the condition illustrated in FIG. 11, the link 318 becomes inclined toward the rear side to assume a condition as illustrated in FIG. 9, whereby the lever 317 is unlocked. Accordingly, the tension spring 316 is effective to raise the caster 315 to its raised position while the drive mechanism 307 moves down owning to its own gravity, and hence the caster 315 is removed from the floor while the drive wheel 307B is disposed in contact with the floor as shown in FIG. 10.

It will be understood from the foregoing description that the switching mechanism 312 of the present embodiment comprises the lever 317, link 318, elevating member 314, caster 315, guide pipe 313 and tension spring 316.

In the fourth embodiment mentioned above, when it is desired to move the cart 301 back or forth by means of the drive wheel 307B of the drive mechanism 307, the lever 317 is positioned at its first position. As shown in FIG. 10, under this condition, the caster 315 of the switching mechanism 312 is at its raised position, and hence the four casters 304, 305 and the drive wheel 307B are disposed in contact with the floor. If the switch 311 or 311' is depressed now, the drive wheel 307B is driven for rotation in either forward or reverse direction, whereby the cart 301 can be driven back or forth by means of the drive wheel 307B without any intervention of an assistant.

As mentioned above, the position of the drive wheel 307B is located below the center of gravity of the cart 301 on which an article or articles to be conveyed are placed thereon. Accordingly, under the condition shown in FIG. 10, the entire cart 301 can be turned about the fulcrum defined by the drive wheel 307B in a greatly facilitated manner, without rotating the drive wheel 307B which is then maintained stationary.

Accordingly, it is a simple matter to divert the direction of the cart 301. As compared with a conventional arrangement in which the casters are disposed at four corners of the cart 301, the maneuverability of the cart 301 is significantly improved. In this manner, in the fourth embodiment, the drive wheel 307B of the drive mechanism 307 substantially functions as a roller when it remains stationary under the condition shown in FIG. 10.

If it is desired to move the cart 301 manually without using the drive wheel 307B in the fourth embodiment, the lever 317 is switched from the first position to the second position shown in FIG. 11. This lowers the caster 315 of the switching mechanism 312 while the drive wheel 307B is maintained in its raised position where it is removed from the floor. Accordingly, under this condition, five casters 304, 305 and 315 may be rolled to move the cart 301 by a manual operation. In this instance, rolling five casters 304, 305 and 315 facilitates moving the cart 301 abeam.

It will be apparent that the fourth embodiment achieves a similar function and effect as achieved by the first embodiment.

In addition, since the drive mechanism 307 is mounted on the connecting member 306 in the manner mentioned above in the fourth embodiment, when the switching mechanism 312 assumes the first position shown in FIG. 10, the gravity of the drive mechanism 307 brings the drive wheel 307B into contact with the floor. Accordingly, the drive wheel 307B is maintained in contact with the floor at a given pressure or great pressure, providing a proper frictional resistance between the drive wheel 307B and the floor when the wheel is rotated as well as when it is stationary.

It is possible to omit the drive mechanism 307 shown in the fourth embodiment, and instead a roller may be mounted below the center of gravity mentioned above, at the bottom of the frame 302 so as to maintain the roller in contact with the floor. With this arrangement, the frame 302 is supported by large casters disposed at the four corners of the frame 302 of the cart 301 and by the roller disposed below the center of gravity during its movement, and accordingly, the roller disposed below the center of gravity functions as a fulcrum during the diversion of direction, thus providing a cart with an excellent maneuverability as in the fourth embodiment.

Figure 12:
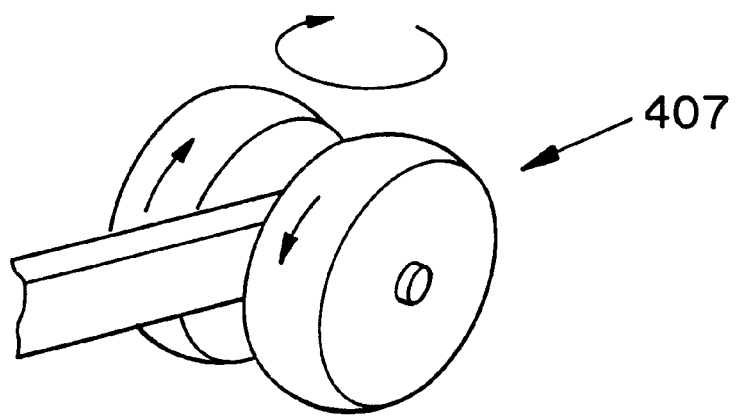
FIG. 12 is a perspective view of rollers used in a two wheeled vehicle.
Figure 13:
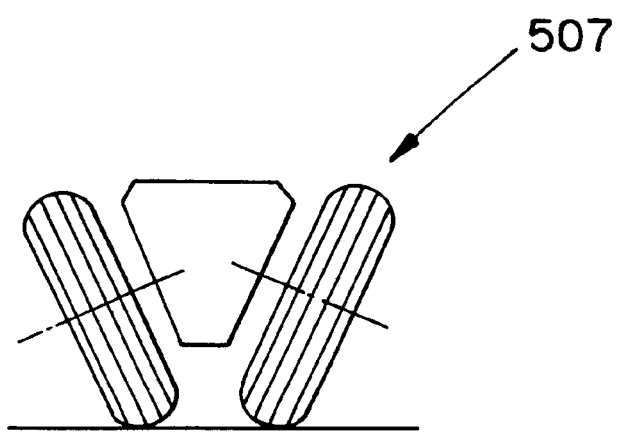
FIG. 13 is a front view of an essential part of rollers of a two-wheeled vehicle in which the wheels are skewed.

Also, when such a roller is provided, rather than a single wheel arrangement, a two wheel roller 407 as illustrated in FIG. 12 may be utilized. In addition, such a two wheel roller may comprise a roller 507 as shown in FIG. 13 in which the both wheels are inclined so that they come close to each other at the point of contact with the floor. With such a two wheel roller 407, 507, the diversion of direction of the cart can be achieved in a more facilitated manner.

When the roller is disposed below the center of gravity of the cart 301 in the manner mentioned above, a conventional wheel which can be alternately switched between a caster function and a roller function in response to a switching operation of the lever may also be used.

Furthermore, the arrangement of the fourth embodiment may be employed in place of rear two casters of a wheelchair of the type which includes six wheels, whereby a maneuverability of such wheelchair can be improved.

While the invention has been described above in connection with several embodiments thereof, it should be understood that a number of changes, modifications and substitutions therein are possible from the above disclosure without departing from the spirit and scope of the invention defined by the appended claims.

What is claimed is:

1. A conveyance apparatus which is movable by a plurality of casters mounted on a frame, with a roller disposed at a location in the vicinity of a point located below the center of gravity of the apparatus when an article or articles to be conveyed are placed thereon, in which the conveyance apparatus includes casters disposed at four corners of the frame, and is a cart having a handle disposed at the rear side of the frame, two of the casters which are located adjacent to the handle are mounted on the opposite sides of a connecting member which is connected to the frame so as to be rockable in a vertical direction, the connecting member being connected with a drive mechanism including a drive wheel which may be driven for rotation as required, the roller being defined by the drive wheel of the drive mechanism, the drive wheel being selectively elevatable between a lower position where it is in contact with a floor and an upper position where it is removed from the floor in response to a switching mechanism.

2. A conveyance apparatus according to claim 1 in which the switching mechanism comprises a guide pipe which is vertically oriented and which is fixedly mounted on a body of the drive mechanism, an elevator slidably extending through the guide pipe, an additional caster connected to a lower end of the elevator, a spring for normally urging the caster and the elevator upward relative to the body of the drive mechanism, a lever rockably connected to the body of the drive mechanism, and a link for connecting the lever with the elevator, the lever having a first switched position with the elevator and the additional caster mounted on the lower end thereof being positioned at an upper position where they are removed from the floor under the influence of the spring while simultaneously causing the drive wheel to assume a lower position where it is in contact with the floor, the lever having a second switched position in which the elevator is lowered relative to the body of the drive mechanism against the resilience of the spring to bring the caster mounted on the lower end of the elevator into contact with the floor while simultaneously bringing the drive wheel to its upper position where it is removed from the floor.

3. A conveyance apparatus comprising:

a frame having opposite sides spaced along a moving direction of said frame, said frame having bottom corners;

casters at said bottom corners adjacent one said side of said frame;

a connecting member on said frame, said connecting member being located adjacent the other said frame side, said connecting member being rockable on said frame in a vertical direction;

further casters on said connecting member and at least one roller on said connecting member, said roller and said further casters being provided on opposite sides of said connecting member, and a switching mechanism for selectively moving the roller between a lower position contacting a floor and an upper position removed from the floor.

4. A conveyance apparatus according to claim 3 wherein the roller is a drive wheel.

5. A conveyance apparatus comprising:

a frame having opposite sides spaced along a moving direction of said frame, said frame having bottom corners;

casters at said bottom corners adjacent one said side of said frame;

a connecting member on said frame, said connecting member being located adjacent the other said frame side, said connecting member being rockable on said frame in a vertical direction;

further casters on said connecting member and at least one roller on said connecting member, said roller and said further casters being provided on opposite sides of said connecting member, and an elevator movable on the connecting member and having a lower end, a vertically adjustable caster mounted on said elevator lower end adjacent said roller, said elevator being vertically movable on said connecting member for lowering the vertically adjustable caster toward a floor and thereby lifting the roller away from such floor.

6. A conveyance apparatus according to claim 5 wherein the additional casters and the roller are pivotably secured to the connecting member.

* * * * *